Oct. 21, 1958  P. D. COMERY ET AL  2,857,187
DEVICE FOR ACHIEVING ANGULAR ADJUSTMENT BETWEEN
ASSOCIATED LEVER AND SHAFT ASSEMBLY
Filed May 22, 1957

INVENTORS
P. D. COMERY
K. E. TRENT
BY Maybee & Legris
ATTORNEYS

United States Patent Office 2,857,187
Patented Oct. 21, 1958

2,857,187

DEVICE FOR ACHIEVING ANGULAR ADJUSTMENT BETWEEN ASSOCIATED LEVER AND SHAFT ASSEMBLY

Peter Dennis Comery, Cooksville, Ontario, and Kenneth Eric Trent, Rexdale, Ontario, Canada, assignors to Orenda Engineers Limited, Malton, Ontario, Canada, a corporation Application May 22, 1957, Serial No. 660,968

3 Claims. (Cl. 287—52.0)

This invention relates to an adjustable assembly for securing an arm to a shaft and, in particular, relates to an assembly whereby the angular relationship between the arm and the shaft may be infinitely varied.

Devices of this nature may be used to adjust and take up slack in mechanical linkages, possibly the most frequent application being in connection with taking up slack in engine or brake actuating linkages, an example of which may be found in United States Patent No. 1,421,408 patented on July 4, 1922, in the name of L. G. Collyer.

Other examples of devices of this nature may be found in the art but all suffer from one disadvantage which it is the specific object of the present invention to overcome. This disadvantage resides in the fact that the assembly becomes damaged, if, due to undue strain, the angular relationship between the two members is slightly changed by unintentional relative movement between the parts. This may occur during tightening or slackening of the device due to a force causing deformation of the one member whilst restraining the other member from sympathetic movement.

Accordingly, it is an object of the present invention to provide a device of the type described in which slight accidental angular displacement of the parts due to undue strain will not damage the assembly.

It is another object of the present invention to provide a device of the type described which may be quickly and readily disassembled for inspection.

In accordance with the invention an adjustable assembly for securing an arm to a shaft comprises an arm having a shaft receiving bore adjacent one end, a slot extending into the bore from the end of the arm adjacent the bore, the slot lying in a plane containing the axis of the bore, a second bore through the arm and the slot transverse to the first bore and spaced from it, a shaft in the first bore having an integral worm wheel formed in its external surface in a plane normal to the axis of the shaft and containing the axis of the second bore, a bolt passing through a second bore and having a nut engaging its threaded end so that the bolt may be tightened to draw the sides of the slot together to firmly clamp the shaft in the first bore, the bolt having, over that portion of its length which spans the slot, an external surface which is not a surface of revolution, a collar having an internal surface complementary to the external surface of the bolt slidable on the bolt but fixed against rotation relative to the bolt and positioned in the slot, the collar having worm teeth formed on its external surface meshing with the worm wheel on the shaft so that rotation of the bolt will cause relative angular displacement between the shaft and the arm, the collar being of an axial length shorter than the width of the slot when the bolt has been tightened to clamp the shaft in the bore in the arm.

A preferred form of the invention will now be described and illustrated in detail in the accompanying drawings in which like reference numerals denote like parts in the various views and in which.

Figure 1:
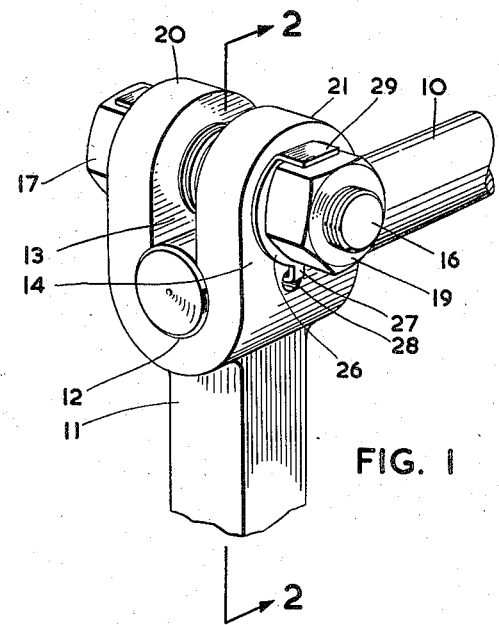
Figure 1 is a perspective view of the assembly constructed in accordance with the present invention.

Referring now to Figure 1, there will be observed a shaft 10 upon which is mounted an arm 11. The purpose of the invention is to provide an adjustable assembly whereby the angular position of the arm 11 relative to the shaft 10 may be conveniently varied, and when the desired relationship has been established, means are provided for rigidly clamping the arm 11 in fixed relationship to the shaft 10.

The arm 11 is provided, adjacent one end, with a shaft receiving bore 12 in which the shaft 10 is a smooth sliding fit. A slot 13 is cut from the end of the arm 11 adjacent the bore 12 into the bore 12 so that the end 14 of the arm 11 is bifurcated.

A second bore 15 is provided through the end 14 of the arm 11, the bore 15 being transverse to the first bore 12 and, preferably, normal thereto. The second bore 15 is spaced from the first bore 12 and passes through the slot 13. A bolt 16 having a head 17 formed to receive a wrench passes through the second bore 15 and is engaged, at its threaded end 18 by a nut 19 which may be tightened to apply a tension to the bolt 16 to draw the two sides 20 and 21 of the bolt 13 together to firmly clamp the arm 11 onto the shaft 10.

The shaft 10 is formed, on its external surface, with an integral worm wheel at 22 in a plane normal to the axis of the shaft, the worm wheel teeth 22 lying in a plane which contains the axis of the bolt 16 when the device is assembled as seen in the drawings.

Figure 2:
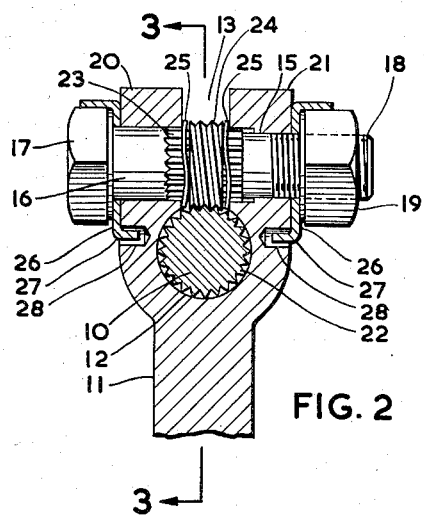
Figure 2 is a section view taken along line 2—2 of Figure 1.
Figure 3:
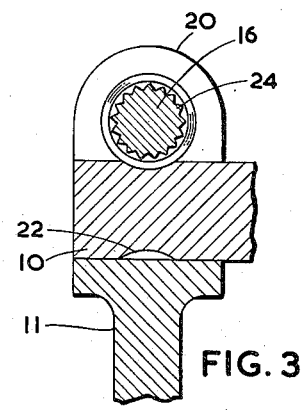
Figure 3 is a section view taken along line 3—3 of Figure 2.

The bolt 16 is provided, intermediate its ends, over that portion spanning the width of the slot 13, with an external surface 23 which is not a surface of revolution and which, in the embodiment illustrated, is a splined surface. An annular collar 24 which has an internal surface complementary to the external surface 23 of the bolt 16 is slidably mounted on the bolt between the two sides 20 and 21 of the slot 13 so as to be axially slidable relative to the bolt but fixed against rotation relative thereto. The axial length of the collar 24 is, as can be seen in Figure 2, less than the width of the slot 13 so that limited axial movement of the collar relative to the bolt 16 may be obtained. The outside diameter of the collar 24 is larger than the diameter of the second bore 15 so that the axial movement of the collar relative to the bolt 16 is limited to that permitted by the width of the slot 13.

On either side of the collar 24 and surrounding the bolt 16 may be provided a spring washer 25 which will, due to their resiliency, maintain the collar 24 substantially centrally located between the adjacent faces of the two sides 20 and 21 of the gap 13.

The external surface of the collar 24 is formed as a worm gear having teeth which engage the teeth 22 of the worm wheel which is integral with the shaft 10.

In operation it will be seen that once the device has been assembled as shown in the drawings the angular relationship of the arm 11 to the shaft 10 may be varied, when the nut 19 is loosely threaded on the end 18 of the bolt 16 by applying a wrench to the head 17 of the bolt and rotating it. The first tendency will be for the arm 11 to resist any angular displacement relative to the shaft 10 and, as a result, the collar 24 will be forced axially of the bolt 16 against the resilience of one of the springs 25 into abutment with one of the adjacent faces of sides 20 and 21 of the slot 13. Once the collar, through the spring washer 25, is abutting one of the faces of the sides 20 or 21 of the slot 13, further axial displacement may not be effected and the worm gear 24 will cause rotation of the worm wheel 10 which will result in relative angular displacement of the arm 11 relative to the shaft 10.

Once the desired angular relationship has been achieved tightening of the nut 19 on the threaded end 18 of the bolt 16 will draw the two sides 20 and 21 of the slot 13 together and will firmly clamp the shaft 10 in the bore 12 of the arm 11.

The advantage of the present invention over the prior art construction resides in the provision of the collar 24 which is slidable on the bolt 16. When the desired angular relationship of the arm 11 relative to the shaft 10 has been achieved it must be assured that the collar 24 is centrally disposed with respect to the two sides 20 and 21 of the slot 13 so that there is a gap between the adjacent edges of the collar 24 and the faces of the slot 13. When this condition is achieved the nut 19 may be securely tightened on the bolt 16 until the shaft is firmly gripped in its bore 12. If, due to extreme stress placed upon the shaft 10 or the arm 11, during the tightening or slackening of the assembly, a slight accidental displacement takes place by the deformation of the bore 12 or the bolt 16, the result will be that the collar 24 will move axially of the bore 12 through a slight distance against the resilience of the spring washers 25 and the accidental displacement will not result in a high shear force being imposed upon the worm teeth on either the shaft 10 or the collar 24.

Obviously, only limited accidental displacement may be achieved by the present construction but it is believed that such limited accidental displacement is sufficiently provided for since the accidental displacement will result in a slackness in the linkage which will become immediately apparent and which may be immediately corrected by re-adjusting the position of the arm 11 on the shaft 10.

In some situations it may not be necessary to provide the spring washers 25 which may be dispensed with without altering the satisfactory operation of the invention. The spring washers, however, assist in automatically centering the collar 24 within the slot 13 and if they are dispensed with a visual check must be made to ensure that the collar 24 is, in fact, centrally located.

Convenient means such as a lock washer 26 having a tab 27 engaging a hole 28 in the end 14 of the arm 11 and a further tab 29 engaging a flat surface on the nut 19 may be provided to prevent accidental loosening of the nut 19 due to vibration to which the device may be subjected. A similar lock washer 26 may be provided with respect to the head 17 of the bolt 16 if desired.

A further advantage of the present invention over the construction disclosed in the United States patent referred to at the beginning of this specification is achieved when it is desired to disassemble the device to inspect the parts.

In the prior art devices in which the worm gear was embodied as an integral part of the bolt 16, it was impossible to remove this bolt without causing a large amount of angular displacement of the arm 11 relative to the shaft 10. With the present invention, however, the nut 19 may be removed, the bolt 16 withdrawn from the bore 15 in the end 14 of the arm 11 and the annular collar 24 may be lifted out without causing any angular displacement of the arm 11 relative to the shaft 10. This, in itself, reduces wear since the device may be disassembled without the wear on the parts to which the other prior devices were subjected.

An additional advantage resides in the fact that the annular collar 24 is of a larger diameter than the bolt 16 and, as a result, the contact area between the meshing teeth of the collar 24 and the worm wheel 22 may be larger than was possible with the prior art devices without making the bore 15 of a size such that the strength of the end 14 of the arm 11 would be weakened.

A detailed description of one preferred embodiment of the present invention has been given for the purpose of illustrating the invention only and the inventor contemplates that minor modifications and alterations in the precise structure described and disclosed may be made without departing from the spirit of the invention or the scope of the appended claims.

What we claim as our invention is:

1. An adjustable assembly for securing an arm to a shaft comprising an arm having a shaft receiving bore adjacent one end, a slot extending into the bore from the end of the arm adjacent the bore, a second bore through the arm and the slot, transverse to the first bore and spaced from it, a shaft in the first bore having an integral annular worm wheel formed in its external surface, a bolt passing through the second bore having a nut engaging its threaded end so that the bolt may be tightened to draw the sides of the slot together to firmly clamp the shaft in the first bore, the bolt having, over that portion of its length which spans the slot, an external surface which is not a surface of revolution, a collar having an internal surface complementary to the external surface of the bolt slidable on the bolt in the slot but fixed against rotation relative to the bolt, the collar having worm teeth formed in its external surface meshing with the worm wheel on the shaft so that rotation of the bolt will cause relative angular displacement between the shaft and the arm, the collar being of an axial length shorter than the width of the slot when the bolt has been tightened to clamp the shaft in the bore in the arm.

2. An adjustable assembly for securing an arm to a shaft comprising an arm having a shaft receiving bore adjacent one end, a slot extending into the bore from the end of the arm adjacent the bore, a second bore through the arm and the slot transverse to the first bore and spaced from it, the shaft in the first bore having an integral annular worm wheel formed in its external surface, a bolt passing through the second bore having a nut engaging its threaded end so that the bolt may be tightened to draw the sides of the slot together to firmly clamp the shaft in the first bore, the bolt having, over that portion of its length which spans the slot, an external surface which is not a surface of revolution, a collar having an internal surface complementary to the external surface of the bolt mounted on the bolt in the slot for limited sliding movement axially of the bolt but fixed against rotation relative to the bolt, the collar having worm teeth formed in its external surface meshing with the worm wheel on the shaft so that rotation of the bolt will cause relative angular displacement between the shaft and the arm, the collar being of an axial length shorter than the width of the slot when the bolt has been tightened to clamp the shaft in the bore in the arm.

3. An adjustable assembly for securing an arm to a shaft comprising an arm having a shaft receiving bore adjacent one end, a slot extending into the bore from the end of the arm adjacent the bore, a second bore through the arm and the slot normal to the first bore and spaced from it, a shaft in the first bore having an integral annular worm wheel formed in its external surface, a bolt passing through the second bore having a nut engaging its threaded end so that the bolt may be tightened to draw the sides of the slot together to firmly clamp the shaft in the first bore, the bolt having a splined external surface spanning the slot, an internally splined collar mounted on the bolt in the slot for limited sliding movement axially of the bolt but fixed against rotation relative to the bolt, the outside diameter of the collar being greater than the diameter of the second bore in the arm to limit the sliding movement of the collar to that permitted by the width of the slot, the collar having worm teeth formed in its external surface meshing with the worm wheel on the shaft so that rotation of the bolt will cause relative angular displacement between the shaft and the arm, the collar being of an axial length shorter than the width of the slot when the bolt has been tightened to clamp the shaft in the bore in the arm.

References Cited in the file of this patent

UNITED STATES PATENTS

| | | |
|---|---|---|
| 1,421,408 | Collyer | July 4, 1922 |
| 2,469,570 | Parish | May 10, 1949 |

UNITED STATES PATENT OFFICE
CERTIFICATE OF CORRECTION

Patent No. 2,857,187                            October 21, 1958

Peter Dennis Comery et al.

It is hereby certified that error appears in the above numbered patent requiring correction and that the said Letters Patent should read as corrected below.

In the grant, lines 3 and 13, and in the heading to the printed specification, line 7, name of assignee, for "Orenda Engineers Limited," each occurrence, read -- Orenda Engines Limited, --.

Signed and sealed this 3rd day of February 1959.

(SEAL)
Attest:
KARL H. AXLINE
Attesting Officer

ROBERT C. WATSON
Commissioner of Patents